(12) United States Patent
Szeppat et al.

(10) Patent No.: US 12,013,029 B2
(45) Date of Patent: Jun. 18, 2024

(54) METHOD FOR OPERATING A DUAL CLUTCH TRANSMISSION OF A MOTOR VEHICLE AND MOTOR VEHICLE

(71) Applicant: AUDI AG, Ingolstadt (DE)

(72) Inventors: Enrico Szeppat, Lunzenau OT Göritzhain (DE); Lutz Gundlach, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 19 days.

(21) Appl. No.: 17/772,302

(22) PCT Filed: Jun. 17, 2020

(86) PCT No.: PCT/EP2020/066697
§ 371 (c)(1),
(2) Date: Apr. 27, 2022

(87) PCT Pub. No.: WO2021/094003
PCT Pub. Date: May 20, 2021

(65) Prior Publication Data
US 2022/0373078 A1  Nov. 24, 2022

(30) Foreign Application Priority Data

Nov. 12, 2019 (DE) .......................... 102019130482.2

(51) Int. Cl.
*F16H 61/00* (2006.01)
(52) U.S. Cl.
CPC ................ *F16H 61/0059* (2013.01)
(58) Field of Classification Search
CPC .... F16H 61/0059; F16H 61/688; F16H 61/22; F16H 3/093; F16H 2003/0931;
(Continued)

(56) References Cited

U.S. PATENT DOCUMENTS

2002/0189383 A1* 12/2002 Schamscha ............. F16H 63/48
74/340
2020/0224761 A1* 7/2020 Larsson ............... F16H 63/3416

FOREIGN PATENT DOCUMENTS

DE         19950696 A1    4/2001
DE     102007019241 A1   10/2008
(Continued)

OTHER PUBLICATIONS

Machine translation of DE 102007019241 A1 (Year: 2007).*
(Continued)

*Primary Examiner* — Jacob S. Scott
*Assistant Examiner* — Farhana Pervin
(74) *Attorney, Agent, or Firm* — Maier & Maier, PLLC

(57) ABSTRACT

A method for operating a dual-clutch transmission having a first partial transmission, a second partial transmission, a first clutch assigned to the first partial transmission, and a second clutch assigned to the second partial transmission, in which the dual-clutch transmission is shifted into a parking lock state. The dual-clutch transmission is shifted into the parking lock state by the following steps: while a first gear of one of the partial transmissions is engaged: carrying out an engagement process provided for engaging a second gear of the one partial transmission; determining that the second gear is not engaged despite the engagement process being carried out; selecting a third gear of the dual-clutch transmission different from the first gear and from the second gear; and engaging the selected third gear such that in the park lock condition, the first gear and the third gear are at least temporarily engaged simultaneously.

12 Claims, 1 Drawing Sheet

(58) Field of Classification Search
CPC ......... F16H 2200/0047; F16H 2321/02; F16H 2321/12; F16H 63/3416; F16H 63/3491; F16H 37/08
See application file for complete search history.

(56) References Cited

FOREIGN PATENT DOCUMENTS

| | | |
|---|---|---|
| DE | 102010028026 A1 | 10/2011 |
| DE | 102011108013 A1 | 1/2013 |
| DE | 102016221794 A1 | 5/2018 |
| EP | 3287669 A1 | 2/2018 |

OTHER PUBLICATIONS

German Examination Report issued on Dec. 4, 2019, in connection with corresponding German Application No. 102019130482.2 (12 pp., including machine-generated English translation).

International Preliminary Report on Patentability with English translation issued on May 17, 2022, in corresponding International Application No. PCT/EP2020/066697; 16 pages.

International Search Report with English translation issued on Aug. 17, 2020, in corresponding International Application No. PCT/EP2020/066697; 4 pages.

* cited by examiner

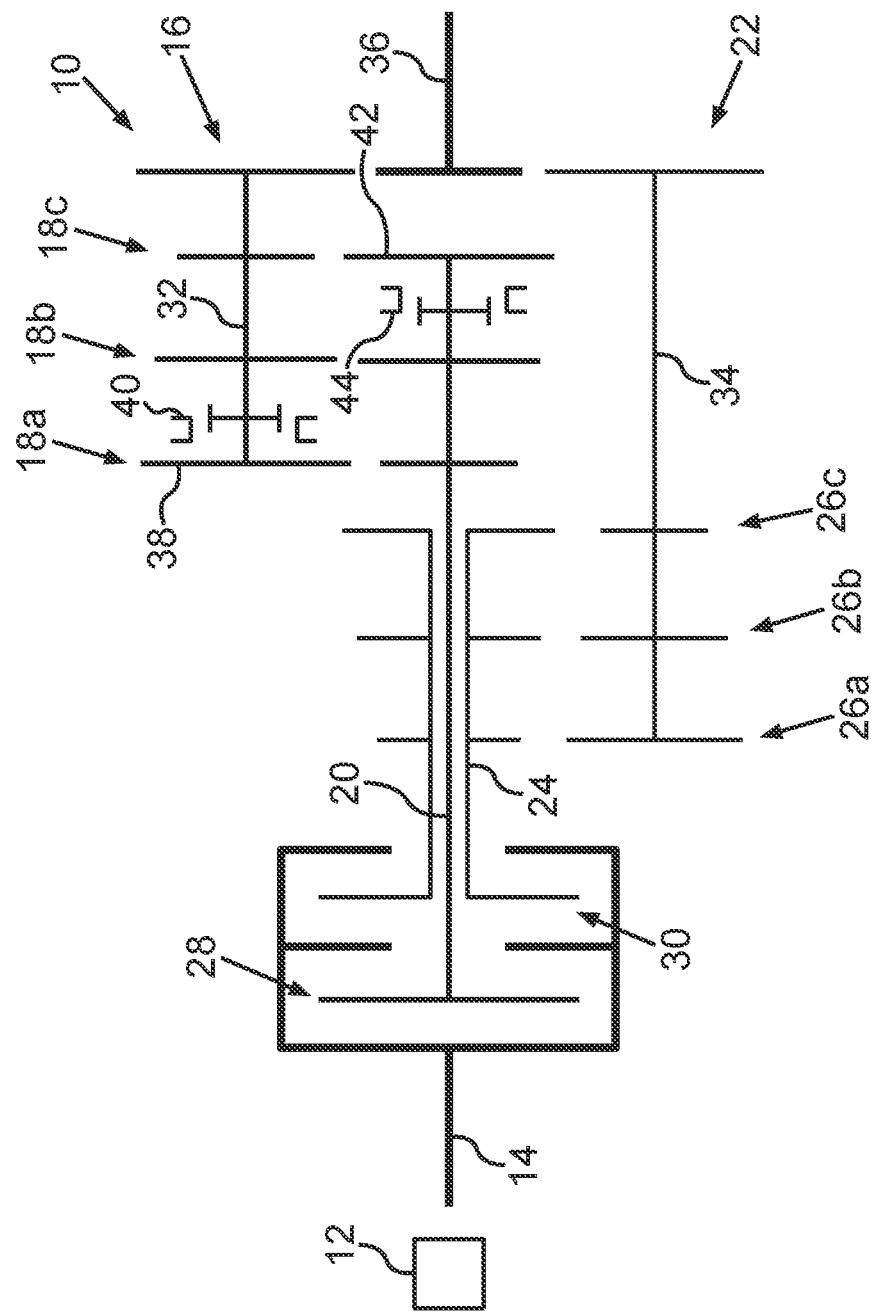

METHOD FOR OPERATING A DUAL CLUTCH TRANSMISSION OF A MOTOR VEHICLE AND MOTOR VEHICLE

FIELD

The invention relates to a method for operating a dual-clutch transmission of a motor vehicle and a motor vehicle.

BACKGROUND

DE 10 2016 221 794 A1 discloses a motor vehicle transmission having a parking lock device having a transmission output shaft, a transmission housing, and a transmission wheel set which can be connected or is connected to the transmission output shaft in a torque-conducting manner.

DE 10 2007 019 241 A1 discloses a known method for controlling an automated dual-clutch transmission. DE 199 50 696 A1 also discloses a dual-clutch transmission for a motor vehicle, having a first transmission input shaft having a starting gear and connected to a first clutch, having a second transmission input shaft having a drive gear and connected to a second clutch, and having a common transmission output shaft.

SUMMARY

The object of the present invention is to create a method for operating a dual-clutch transmission and a motor vehicle having such a dual-clutch transmission, so that a parking lock of the dual-clutch transmission can be implemented in a particularly advantageous manner.

A first aspect of the invention relates to a method for operating a dual-clutch transmission of a motor vehicle that is preferably designed as an automobile, in particular as a passenger vehicle. For example, at least one wheel of the motor vehicle is drivable via the dual-clutch transmission. In particular, at least or exactly two wheels of the motor vehicle can be driven via the dual-clutch transmission, as a result of which the motor vehicle can be driven as a whole, for example. This means that the motor vehicle in its completely produced state has the dual-clutch transmission and the wheel also referred to as a vehicle wheel or the wheels also referred to as vehicle wheels. The respective wheel is, for example, a ground contact element, via which the motor vehicle is supported or can be supported on a ground downwards in the vertical direction of the vehicle. When the motor vehicle is driven along the ground while the motor vehicle is supported on the ground downwards in the vertical direction of the vehicle, the wheel rolls on the ground.

The dual-clutch transmission has a first partial transmission and a second partial transmission. The dual-clutch transmission also has a first clutch associated with the first partial transmission and a second clutch associated with the second partial transmission. For example, the motor vehicle has a drive motor, by which the motor vehicle can be driven via the dual-clutch transmission. In this case, the drive motor comprises an output shaft designed, for example, as a crankshaft. The feature that the first clutch is assigned to the first partial transmission can be understood in particular to mean that the first partial transmission, in particular a first transmission input shaft of the first partial transmission, can be coupled to the output shaft in a torque-transmitting manner via the first clutch or by means of the first clutch, in particular while the second clutch is open. The feature that the second clutch is assigned to the second partial transmission can be understood in particular to mean that the second partial transmission, in particular a second transmission input shaft of the second partial transmission, can be coupled to the output shaft in a torque-transmitting manner via the first clutch or by means of the first clutch, in particular while the first clutch is open. Thus, for example, the motor vehicle can be driven by the drive motor via the dual-clutch transmission and in particular via the first partial transmission, while driving of the motor vehicle by the partial transmission caused by the drive motor does not take place. Furthermore, the motor vehicle can be driven by the drive motor via the dual-clutch transmission and in this case via the second partial transmission, while driving of the motor vehicle via the first partial transmission caused by the drive motor does not take place. The respective clutch is preferably designed as a friction clutch, in particular as a multi-plate clutch, as a result of which a particularly high level of comfort, in particular driving comfort, of the motor vehicle can be achieved. In the method, the dual-clutch transmission is switched to a parking lock state, which is explained in more detail hereinafter.

Due to or in the parking lock state, a parking lock, in particular a mechanical parking lock, of the dual-clutch transmission is implemented or activated or engaged. The dual-clutch transmission is clamped by the parking lock, in particular in such a way that the above-mentioned wheels are secured against a respective rotation. In particular, the motor vehicle is secured or to be secured against undesired rolling away by the engaged or activated parking lock, in particular if the motor vehicle is stopped and/or parked on a hillside and/or on a downhill slope.

In order to be able to implement the parking lock particularly advantageously and in particular to be able to engage it particularly reliably, it is provided according to the invention that the dual-clutch transmission is shifted into the parking lock state by the following steps, i.e., by means of the following steps. In a first of the steps, while a first gear of one of the partial transmissions is engaged, a first engagement process provided for engaging a second gear of the one partial transmission is carried out. During the engagement process, for example, at least one actuator is activated and thereby operated, in particular with the fundamental goal of moving, for example, a shifting element that is also referred to as a gear selector and is assigned to the second gear.

In a second of the steps, it is determined that the second gear has not been engaged or is not engaged despite the engagement process being carried out. In other words, it is determined in the second step that, despite the engagement process being carried out, the second gear was not engaged or the fundamentally desired engagement of the second gear was prevented. In other words, it is determined or recognized in the second step that the engagement process was unsuccessful with regard to the engagement of the second gear. This means that within the scope of the invention, the engagement process itself or the performance of the engagement process itself does not necessarily mean that the performance of the engagement process itself results in the engagement of the second gear, but in particular within the scope of the invention the engagement process or the performance of the engagement process as such is to be understood that one attempts or an attempt is made to engage the second gear. However, the engagement of the second gear can be prevented or omitted, for example, by the fact that the previously described activation of the actuator does not results in a movement of the gear selector provided or required for engaging the second gear, or that a movement of the gear selector caused by the actuation of the actuator does take place, but does not results in the actual engagement of second gear. This is determined, for example, in the second step, in particular detected or recognized. For example, in the second step it is determined that despite the performance of the engagement process, the engagement of the second gear has not taken place, that at least one position of the gear selector is detected by means of at least one position sensor. For example, the second gear is engaged when the gear selector is in an engaged position. In other words, for example, the second gear is engaged in that the gear selector can be moved or is being moved into the engaged position, in particular by means of the actuator and in particular by activating the actuator. For example, the position of the gear selector detected by means of the position sensor is compared to the engaged position. If the comparison shows that the current or actual position of the gear selector detected by the position sensor deviates from the engaged position, it can be inferred that, despite the performance of the engagement process, a movement of the gear selector into the engaged position and thus the engagement of the second gear have not taken place, i.e., have not occurred.

In a third of the steps of the method, in particular depending on the fact that it is determined in the second step that the second gear is not engaged despite the performance of the engagement process, a third gear of the dual-clutch transmission different from the first gear and from the second gear is selected. In a fourth of the steps, the selected third gear is engaged such that in the parking lock state, the first gear and the third gear are at least temporarily engaged simultaneously. As a result, the dual-clutch transmission is clamped or the dual-clutch transmission can be clamped in this way, as a result of which the parking lock, which is in particular mechanical, is engaged or activated. It is preferably provided that both clutches are opened simultaneously in the parking lock state, in particular while the first gear and the third gear are engaged simultaneously. It is preferably provided that the second gear and the third gear, also referred to as an alternative gear, are gears of the same partial transmission.

Due to the parking lock state, in which, for example, the first gear and the third gear are engaged simultaneously, a mechanical parking lock can be implemented without an additional, mechanical parking lock being required for this purpose. The parking lock is preferably engaged when the motor vehicle is stationary in order to secure the motor vehicle against rolling away, in particular independently of the motor vehicle being held in place, also known as a parking brake. In particular, when the motor vehicle is parked on an uphill or downhill slope and the parking lock is engaged, the dual-clutch transmission is clamped by the intrinsic weight of the motor vehicle and by a downhill slope force resulting from the intrinsic weight of the motor vehicle and acting on the motor vehicle, in particular in the vehicle longitudinal direction. In particular, the downhill slope force can result in a downhill slope torque, which is introduced into the dual-clutch transmission, for example, via a transmission output shaft of the dual-clutch transmission. For example, in order to deactivate or disengage the parking lock state, i.e., to end the parking lock state, one of the gears that are simultaneously engaged in the parking lock state is disengaged, in particular while the respective other one of the gears engaged simultaneously in the parking lock state remains engaged.

The gear selector provided for engaging the second gear is, for example, a gear selector for the formfitting engagement of the second gear. The gear selector is movable, for example, in particular relative to a housing of the dual-clutch transmission, in order to thus move, for example, a shifting element, in particular a formfitting shifting element. For example, the shifting element, which is in particular formed separately from the gear selector, is movable, in particular translationally, relative to the housing in order to thus engage the second gear. The switching element can be a shifting sleeve, for example. In particular, it is conceivable that the switching element has a first toothing. The switching element is, for example, connected in a rotationally-fixed manner to a transmission shaft of the dual-clutch transmission, also referred to simply as a transmission, wherein the switching element is movable, in particular translationally, relative to the housing and relative to the transmission shaft.

In order to actually engage the second gear, for example, the gear selector is moved in such a way that the shifting element is moved in such a way that the first toothing engages and thus comes into formfitting interaction with a corresponding second toothing, which is provided, for example, on a gear wheel of the second gear. The goal of the engagement process is basically to connect the gear wheel to the transmission shaft in a rotationally-fixed manner by means of the teeth and by means of the shifting element, since when the second gear is disengaged, the gear wheel is rotatable relative to the transmission shaft, it is therefore not connected to the transmission shaft in a rotationally fixed manner, but rather is rotatably arranged on the transmission shaft.

The engagement of the second gear can be prevented by a so-called tooth-on-tooth position. The tooth-on-tooth position can be understood in particular as meaning that at least one first tooth of the first toothing is overlapped or covered by at least one tooth of the second toothing in the direction of movement of the gear selector, wherein the gear selector is to be moved or is moved in the direction of movement to engage the second gear. Because the tooth of the first toothing is overlapped or covered in the direction of movement by the tooth of the second toothing, the tooth of the first toothing is in supporting contact with the tooth of the second toothing along the direction of movement, or the tooth of the first toothing comes along the direction of movement into supporting contact with the tooth of the second toothing, in particular when the gear selector is moved slightly and is thereby moved in the direction of the engaged position. However, the tooth-on-tooth position avoids a complete movement of the gear selector into the engaged position. Such a tooth-on-tooth position is statistically rather unlikely, but it is readily possible. In other words, the or an engagement of the second gear can be prevented due to a statistically possible geometric position of the gear selector, wherein, for example, the above-mentioned tooth-on-tooth position is such a statistically possible geometric position of the gear selector.

The engagement process or reaching the engaged position does not necessarily have to be prevented by a tooth-on-tooth position, for example, there may not be a tooth-on-tooth position, but possibly there may not be sufficient flank clearance and therefore there may not be sufficient torsional path, in particular of the gear wheel, so that the second gear cannot be engaged. This may be the case since the goal in modern transmissions is usually to avoid excessive flank clearance and thereby excessive noise such as chatter.

The method according to the invention now makes it possible to bring about the parking lock state or to securely engage the parking lock in particular even when the engagement of second gear is not possible, in particular due to a statistically possible geometric position of the park selector and is thus prevented. As a result, the method according to the invention makes it possible to particularly advantageously secure the motor vehicle against undesired rolling away, so that particularly safe operation can be achieved.

In particular, it can be provided that after the engagement process has been carried out or after the engagement process has ended, the gear selector is moved into a neutral position and, for example, moved in a further direction of movement opposite to the direction of movement, whereupon, for example, third gear is finally engaged. Overall, it can be seen that engaging the parking lock, i.e., shifting the dual-clutch transmission into the parking lock state, is possible in at least almost all geometric positions of the gear selector. This can be done, for example, starting from conventional transmissions without further component adaptations, since the method according to the invention can be implemented, for example, using components that are already present and in particular using an already existing actuator activation. The dual-clutch transmission is preferably an automatic transmission, i.e., an automated or automatic dual-clutch transmission, so that, for example, the engagement process and the engagement of the respective gear are carried out automatically, in particular by means of an electronic computing device. It is thus provided, for example, that the steps are carried out by means of an electronic computing device of the dual-clutch transmission, in particular of the motor vehicle, and it is determined in particular here that the second gear is not engaged despite the performance of the engagement process.

The above-mentioned first gear can, but does not necessarily have to be, a starting gear or the forward gear of the dual-clutch transmission having the highest transmission ratio, and therefore the above-mentioned second or third gear does not necessarily have to be the forward gear having the second or third highest transmission ratio either. Rather, the first, second, and third gear can be any gears, in particular forward gears, of the dual-clutch transmission, in particular of the same partial transmission.

In order to be able to activate or engage the parking lock particularly reliably, one embodiment of the invention provides for the third gear to be a gear of the one partial transmission. Thus, in the parking lock state, the first gear and the third gear of the one partial transmission are at least temporarily engaged simultaneously, so that the one partial transmission is also referred to as a locked partial transmission. Preferably, the first gear and the third gear are simultaneously engaged at least temporarily in the parking lock state, while preferably all gears of the respective other partial transmission are disengaged, or while at least or exactly one is engaged in the other partial transmission. Thus, the other partial transmission is, for example, a so-called non-locked partial transmission.

It has also been shown to be advantageous if the third gear is a gear of the other partial transmission. This also allows the parking lock state to be activated particularly reliably.

A further embodiment is characterized in that the first gear is engaged in the parking lock state, in that a first gear wheel of the first gear, designed as an idler wheel and rotatably arranged on a first shaft of the dual-clutch transmission, is connected in a rotationally-fixed manner to the first shaft by means of a first shifting element, which is assigned to the first gear, is arranged on the first shaft, and is connected in a rotationally-fixed manner to the first shaft. The third gear is engaged, for example, in such a way that a second gear wheel of the third gear, designed as an idler wheel and rotatably arranged on a second shaft of the dual-clutch transmission, is connected in a rotationally-fixed manner to the second shaft by means of a second shifting element, which is assigned to the third gear, is arranged on the second shaft, and is connected in a rotationally-fixed manner to the second shaft. As a result, the parking lock can be ensured or engaged in a particularly advantageous manner when the second gear cannot be engaged.

In order to be able to engage the parking lock particularly securely and thus to be able to secure the motor vehicle particularly securely against undesired rolling away, it is provided in a further embodiment of the invention that the respective shifting element is a formfitting shifting element, in particular a claw clutch.

It has also been shown to be particularly advantageous if, after the third gear has been engaged, the third gear is disengaged and the second gear is engaged, in particular while the first gear remains engaged. This embodiment is based on the finding that, for example, by engaging the third gear or as a result of the engagement of the third gear, a movement of the gear selector assigned to the second gear is caused such that the gear selector, for example, is moved out of the above-described position preventing the engagement of the second gear and comes into a position in which the second gear can actually be engaged. If the second gear is then engaged, for example, by carrying out the engagement process again, the parking lock can subsequently be engaged particularly securely. It is preferably provided that, for example, the second gear is engaged first and then the third gear is disengaged, or vice versa. The first gear and the second gear are then preferably engaged simultaneously in the parking lock state, in particular while all other gears of the dual-clutch transmission are disengaged or while at least or exactly one gear of the other partial transmission is engaged.

A further embodiment is characterized in that, in particular after engaging the third gear, the first gear is disengaged and a fourth gear of the dual-clutch transmission that differs from the first gear, the second gear, and the third gear is engaged, so that in the parking lock state the third gear and the fourth gear are engaged simultaneously. As a result, for example, the motor vehicle can be secured particularly securely against undesired rolling away. The third gear and the fourth gear are preferably gears of the same partial transmission. In particular, it can thus be provided that alternately or as needed the one partial transmission or the other partial transmission is used to effectuate the parking lock.

It has also been shown to be particularly advantageous if at least or exactly one of the clutches or both clutches are closed simultaneously in the parking lock state. One of the clutches is preferably closed while the other clutch is open. This allows the parking lock to be kept securely engaged.

A further embodiment is characterized in that the method is carried out when the motor vehicle is stationary.

A second aspect of the invention relates to a motor vehicle, preferably designed as an automobile, in particular as a passenger vehicle, which is designed to carry out a method according to the first aspect of the invention. Advantages and advantageous embodiments of the first aspect of the invention are to be regarded as advantages and advantageous embodiments of the second aspect of the invention and vice versa.

The invention also includes refinements of the method according to the invention, which have features as already described in the context of the refinements of the motor vehicle according to the invention. For this reason, the corresponding refinements of the motor vehicle according to the invention are not described again here. The motor vehicle according to the invention is preferably designed as an automobile, in particular as a passenger vehicle or truck, or as a passenger bus or motorcycle. The invention also comprises combinations of the features of the described embodiments.

BRIEF DESCRIPTION OF THE FIGURES

An exemplary embodiment of the invention are described hereinafter. For this purpose, the only FIGURE shows a schematic representation of a dual-clutch transmission of a motor vehicle, wherein the dual-clutch transmission is operated according to a method according to the invention.

The exemplary embodiment explained hereinafter is a preferred embodiment of the invention. In the exemplary embodiment, the described components of the embodiments each represent individual features of the invention to be considered independently of one another, which each also refine the invention independently of one another. Therefore, the disclosure is also intended to encompass combinations of the features of the embodiment other than those illustrated. Furthermore, the described embodiment can also be supplemented by further ones of the above-described features of the invention.

DETAILED DESCRIPTION

The only FIGURE shows a schematic representation of a dual-clutch transmission 10 of a motor vehicle, which is preferably designed as an automobile or preferably as a passenger vehicle. The motor vehicle has at least one drive motor, by means of which at least two wheels of the motor vehicle can be driven via the dual-clutch transmission 10. By driving the wheels, the motor vehicle can be or is driven as a whole. The wheels are ground contact elements via which the motor vehicle can be or is supported on a ground in the vehicle vertical direction downwards. The wheels, also referred to as vehicle wheels, roll on the ground when the motor vehicle is driven along the ground, while the motor vehicle is supported downwards on the ground via the wheels in the vertical direction of the vehicle. The drive motor is shown particularly schematically in the FIGURE and is identified by 12 there. The drive motor 12 can be an internal combustion engine designed as a reciprocating piston engine, for example, or an electric machine. The drive motor 12 has an output shaft 14 designed as a crankshaft, for example.

The dual-clutch transmission 10 has a first partial transmission 16, which comprises, for example, three first gears 18a-c. In addition, the first partial transmission 16 has a first transmission input shaft 20. The dual-clutch transmission 10 also includes a second partial transmission 22, which has a second transmission input shaft 24 and second gears 26a-c. The gears 18a-c are, for example, odd gears or are also referred to as odd gears, wherein the gear 18a is the so-called first gear, the gear 18b is the so-called third gear, and the gear 18c is the so-called fifth gear of the dual-clutch transmission 10, for example. The gears 26a-c are also referred to as even gears, for example, or are so-called even gears of the dual-clutch transmission 10, wherein the gear 26a, for example, is the second gear, the gear 26b is the fourth gear, and the gear 26c is the sixth gear of the dual-clutch transmission 10. The gears 18a-c and 26a-c can also be designed as forward gears, referred to as forward driving gears, for causing a respective forward travel of the motor vehicle, or at least or exactly one of the gears 18a-c and 26a-c is a reverse gear for causing a reverse travel of the motor vehicle. The first gear is a forward starting gear, by means of which the motor vehicle can be started forward. The reverse gear is a reverse starting gear, by means of which the motor vehicle can be started in reverse.

The dual-clutch transmission 10 has a first clutch 28 assigned to the partial transmission 16, which, for example in relation to the partial transmissions 16 and 22, in particular in relation to the transmission input shafts 20 and 24, is assigned exclusively to the partial transmission 16 or exclusively to the transmission input shaft 20, but is not assigned to the partial transmission 22 and not to the transmission input shaft 24. The dual-clutch transmission 10 additionally has a second clutch 30 assigned to the partial transmission 22, which, for example in relation to the partial transmissions 16 and 20, in particular in relation to the transmission input shafts 20 and 24, is assigned exclusively to the partial transmission 22 or exclusively to the transmission input shaft 24, but is not assigned to the partial transmission 16 and not to the transmission input shaft 20. This means that, with respect to the transmission input shafts 20 and 24, exclusively the transmission input shaft 24 can be connected to the output shaft 14 in a torque-transmitting manner by means of the clutch 28. With respect to the transmission input shafts 20 and 24, exclusively the transmission input shaft 24 can be connected or coupled to the output shaft 14 in a torque-transmitting manner by means of the clutch 30. In addition, the transmission input shaft 24 is designed as a hollow shaft, which in the present case is penetrated at least partially, in particular at least predominantly or completely, by the transmission input shaft 20 designed, for example, as a solid shaft. The respective partial transmission 16 or 22 also has a side shaft 32 or 34, respectively. The dual-clutch transmission 10 has a transmission output shaft 36 which is common to the partial transmissions 16 and 20, in particular the side shafts 32 and 34, and which is drivable by the side shafts 32 and 34.

The drive motor 12 can provide at least one drive torque via its output shaft 14, which can be introduced into the partial transmission 16 or 22 via the respective clutch 28 or 30 and can be transmitted via this to the transmission output shaft 36. In this way, the above-mentioned wheels can be driven by the drive motor 12 via the dual-clutch transmission 10. It is preferably provided that the clutch 30 is open when the clutch 28 is closed. It is also provided, for example, that the clutch 28 is opened when the clutch 30 is closed. Thus, preferably only one of the partial transmissions 16 and 20 is always connected to the output shaft 14 in a torque-transmitting manner via the respective clutch 28 or 30.

A method for operating the dual-clutch transmission 10 is described hereinafter. In the method, the dual-clutch transmission 10 is shifted into a parking lock state, so that in the method the dual-clutch transmission 10 is at least temporarily in the parking lock state.

In order to be able to particularly safely engage the parking lock state and thus a mechanical parking lock, by means of which, for example, the above-mentioned wheels can be secured against rotation and the motor vehicle can thereby be secured against undesired rolling away, the dual-clutch transmission 10 is shifted into the parking lock state by the following steps. In a first of the steps, while the gear 18a of the partial transmission 16 is engaged, for example, an engagement process provided for engaging the gear 18b, for example, is carried out. In a second of the steps, it is determined that the second gear 18b has not been engaged or the engagement did not take place despite the engagement process being carried out. In a third of the steps, for example, the gear 18c is selected and in a fourth of the steps, the selected gear 18c is engaged such that in the parking lock state, the gear 18a and the gear 18c are at least temporarily engaged simultaneously. It can be seen here that the gears 18a and 18c that are simultaneously engaged at least temporarily in the parking lock state are gears of the same partial transmission 16.

In the parking lock state, the gear 18a is preferably engaged in that a first gear wheel 38 of the gear 18a, designed as an idler wheel and rotatably arranged on the side shaft 32 of the dual-clutch transmission 10, in particular the partial transmission 16, is connected in a rotationally fixed manner to the side shaft 32 by means of a first shifting element 40, which is assigned to the first gear 18a, is arranged on the side shaft 32, and is connected in a rotationally fixed manner to the side shaft 32. The switching element 40 is a shifting sleeve. The gear 18c is preferably engaged in that a second gearwheel 42 of the gear 18c, designed as an idler wheel and rotatably arranged on the transmission input shaft 20 of the dual-clutch transmission 10, in particular of the partial transmission 16, is connected in a rotationally-fixed manner to the transmission input shaft 20 by means of a second shifting element 44, which is assigned to the gear 18c, is arranged on the transmission input shaft 20, and is connected in a rotationally-fixed manner to the transmission input shaft 20. The switching element 44 is preferably a second shifting sleeve. The shifting elements 40 and 44 are gear selectors, in particular formfitting gear selectors, which are moved into a respective engaged position to engage the gears 18a and 18c. As a result, the shifting element 40 is connected in a formfitting manner to the gearwheel 38 and the shifting element 44 is connected in a formfitting manner to the gearwheel 42, so that the gearwheel 38 is connected in a formfitting manner to the side shaft 32 via the shifting element 40, and the gearwheel 42 is connected in a formfitting manner to the transmission input shaft 20 via the shifting element 44. The side shaft 32 and the transmission input shaft 20 are respective shafts of the dual-clutch transmission 10, in particular of the partial transmission 16, which are different from one another and are formed separately from one another, wherein the shafts or arranged offset from one another and extend at least essentially in parallel to one another. In addition, the respective shifting element 40 or 44 is a formfitting shifting element, in particular a claw clutch, by means of which the respective gear wheel 38 or 42 is connectable or connected in a formfitting and rotationally-fixed manner to the side shaft 32 or to the transmission input shaft 20.

In principle, it is conceivable that after the gear 18c has been engaged, the gear 18c is disengaged and, for example, the gear 18b is engaged, in particular while the gear 18a remains engaged, so that in the parking lock state the gears 18a and 18b are engaged simultaneously, at least temporarily. Furthermore, it is conceivable that, in particular after the gear 18c is engaged, the first gear 18a is disengaged and a fourth gear of the dual-clutch transmission 10 that differs from the gear 18a, the gear 18b, and the gear 18c is engaged, so that in the parking lock state, for example, the gear 18c or the gear 18b and fourth gear are engaged simultaneously, at least temporarily. The fourth gear is, for example, one of the gears 26a-c and thus a gear of the partial transmission 22 or a gear of the partial transmission 16.

Overall, it can be seen that the parking lock state can also be securely activated when it is not possible to engage the gear 18b, which is actually intended as a locking gear, for example due to an unforeseen event such as an unfavorable location or position of a gear selector assigned to the gear 18b. Then, instead of the locking gear that is actually provided, the gear 18c is at least temporarily engaged, for example, in order to clamp the dual-clutch transmission 10, in particular the partial transmission 16. This clamping activates or engages a mechanical parking lock, as a result of which the motor vehicle can be secured against undesired rolling away.

The invention claimed is:

1. A method for operating a dual-clutch transmission of a motor vehicle, having a first partial transmission having both an input shaft and a side shaft, a second partial transmission, a first clutch assigned to the first partial transmission, and a second clutch assigned to the second partial transmission, in which the dual-clutch transmission is switched to a parking lock state, wherein the dual-clutch transmission is shifted into the parking lock state by the following steps:
while a first gear of the first partial transmissions is engaged:
carrying out an engagement process provided for engaging a second gear of the first partial transmission;
determining that the second gear is not being engaged despite the engagement process being carried out;
selecting a third gear of the dual-clutch transmission different from the first gear and from the second gear; and
engaging the selected third gear, so that in the parking lock state, the first gear and the third gear are at least temporarily engaged simultaneously,
wherein in the parking lock state, the first gear is engaged in that a first gear wheel of the first gear, configured as an idler wheel and rotatably arranged on the side shaft of the dual-clutch transmission, is connected in a rotationally-fixed manner to the side shaft by a first shifting element, which is assigned to the first gear, is arranged on the side shaft, and is connected in a rotationally-fixed manner to the side shaft, wherein the third gear is engaged in that a second gearwheel of third gear, configured as an idler wheel and rotatably arranged on the input shaft of the dual-clutch transmission, is connected in a rotationally-fixed manner to the input shaft by a second shifting element, which is assigned to the third gear, is arranged on the input shaft, and is connected in a rotationally-fixed manner to the input shaft, and the side shaft and the input shaft.

2. The method as claimed in claim 1, wherein the third gear is a gear of the first partial transmission.

3. The method as claimed in claim 2, wherein the third gear is a gear of the second partial transmission.

4. The method as claimed in claim 2, wherein after engaging the third gear, the third gear is disengaged and the second gear is engaged, in particular while the first gear remains engaged.

5. The method as claimed in claim 2, wherein after engaging the third gear, the first gear is disengaged and a fourth gear of the dual-clutch transmission that differs from the first gear, the second gear and the third gear is engaged so that in the parking lock state, the third gear and the fourth gear are engaged simultaneously.

6. The method as claimed in claim 1, wherein the respective shifting element is a formfitting shifting element.

7. The method as claimed in claim 6, wherein after engaging the third gear, the third gear is disengaged and the second gear is engaged, in particular while the first gear remains engaged.

8. The method as claimed in claim 1, wherein after engaging the third gear, the third gear is disengaged and the second gear is engaged, in particular while the first gear remains engaged.

9. The method as claimed in claim 1, wherein after engaging the third gear, the first gear is disengaged and a fourth gear of the dual-clutch transmission that differs from the first gear, the second gear and the third gear is engaged so that in the parking lock state, the third gear and the fourth gear are engaged simultaneously.

10. The method as claimed in claim 1, wherein in the parking lock state, at least or precisely one of the clutches or both clutches are closed at the same time.

11. The method as claimed in claim 1, the method is carried out when the motor vehicle is stationary.

12. A vehicle having a dual-clutch transmission which is designed to carry out the method as claimed in claim 11.

* * * * *